United States Patent
Miwa

[11] Patent Number: 5,904,024
[45] Date of Patent: May 18, 1999

[54] MOUNT CONSTRUCTION OF FOAM SUBSTRATE IN HOLLOW STRUCTURES

[75] Inventor: Norimichi Miwa, Toyota, Japan

[73] Assignees: Axxis Corp., Livonia, Mich.; Kyowa Sangoy Co., Ltd.; Neo-ex Labo, both of Japan

[21] Appl. No.: 08/806,332

[22] Filed: Feb. 26, 1997

[51] Int. Cl.⁶ .................................................... E04C 3/30
[52] U.S. Cl. .................. 52/732.1; 52/731.2; 52/737.6
[58] Field of Search ................ 52/309.9, 731.2, 52/732.1, 738.1, 737.6, 698, 232

[56] References Cited

U.S. PATENT DOCUMENTS

| | | | |
|---|---|---|---|
| 1,243,001 | 10/1917 | Stewart | 52/738.1 X |
| 3,300,940 | 1/1967 | Golasz | 52/737.6 |
| 3,336,708 | 8/1967 | Rambelle | 52/737.6 X |
| 3,344,567 | 10/1967 | Cowan et al. | 52/737.6 X |
| 3,603,054 | 9/1971 | Didry | 52/737.6 X |
| 4,100,710 | 7/1978 | Kowallik | 52/309.9 |
| 5,309,690 | 5/1994 | Symons | 52/309.9 |
| 5,533,312 | 7/1996 | Michalcheon | 52/309.9 |
| 5,566,525 | 10/1996 | Schwarz | 52/309.9 X |
| 5,572,832 | 11/1996 | Haavisto et al. | 52/737.6 X |

*Primary Examiner*—Carl D. Friedman
*Assistant Examiner*—Beth Aubrey
*Attorney, Agent, or Firm*—Weintraub & Brady

[57] ABSTRACT

A mount for insertion into a hollow space of a hollow structure such as a vehicular pillar includes an expandable foam substrate having a at least one support panel secured thereto via a tack. The so-formed assembly is disposed within the hollow space via a mount component which includes a base having a pair of spaced apart mounting pieces which extend from the base, the assembly being disposed between the mount pieces. The assembly is tacked to the mount component by having a tack wire project through the support panel, the foam substrate and the mounting piece. The mount is secured to the interior wall of the hollow space through either a clip, a magnet, a suction disc or the like.

7 Claims, 4 Drawing Sheets

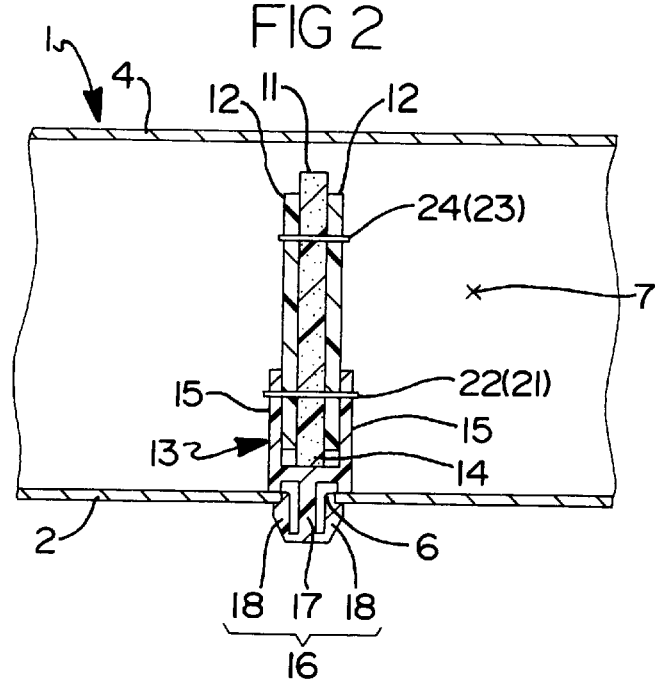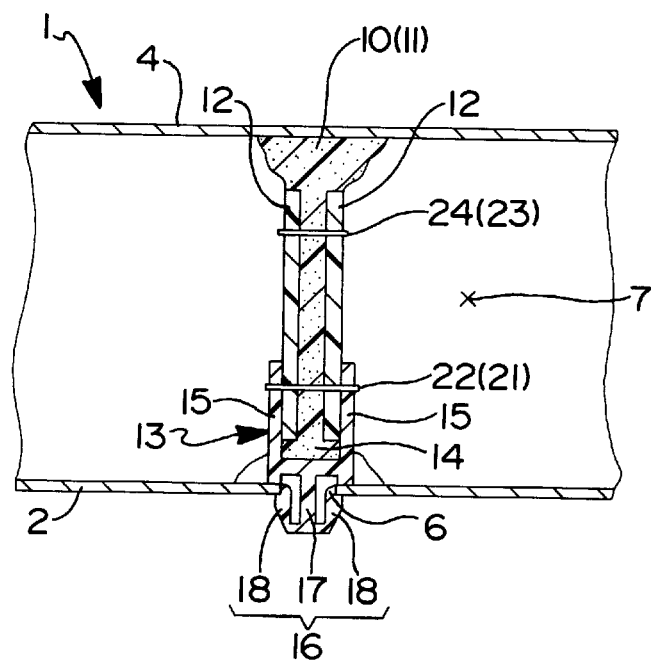

MOUNT CONSTRUCTION OF FOAM SUBSTRATE IN HOLLOW STRUCTURES

BACKGROUND OF THE INVENTION

1. Field of the Invention

This invention concerns the mount construction of foam substrates inside a hollow structure. It involves the mount construction for installing a foam substrate that insulates a hollow space by foam expansion from external heat inside a hollow space of a hollow structure for the primary purpose of providing vibration proofing and noise proofing in a hollow, box-shaped, closed cross-sectional space that is formed by multiple panels, such as vehicle body pillars, rocker panels, roof side panels, etc.

2. Prior Art

An example of the type of mount construction for a foam substrate in a hollow structure is disclosed in Patent Disclosure Bulletin Heisei 7 (1995) -232664.

In this example, and as shown in FIG. 9 hereof, a mount component 113, which is composed of a bottom panel 114 and two walls 112, 112' forms an abridged U-shaped cross section. A groove 114a is created in the center of the upper surface of the bottom panel 114 of the mount component 113, while the foam substrate 111 is fixed to the bottom panel 114 by a part of its lower surface 111a being fitted into the aforementioned groove 114a.

Furthermore, a flat panel-shaped magnet 126 is attached to the lower surface of the bottom panel 114, so as to attach the mount component, with the foam substrate 111 affixed onto the inner wall surface of a hollow structure through the magnetic force of the magnet 126.

As the foam substrate 111 foam-expands from heat from outside of the hollow structure, the direction of the foam developed by the foam substrate 111 is controlled by the two side walls 112, 112' of the mount component 111. As a result, the foam substrate 111 foam-expands into a foam substance in a direction orthogonal to the longitudinal direction of the hollow space inside the hollow structure, thus, efficiently insulating the hollow space.

In the aforementioned conventional mount construction, the design requires fitting a part of the lower surface of the foam substrate into a groove which is created approximately in the center of the bottom panel of the mount component. It is difficult to achieve stable attachment of the foam substrate to the mount component. In some cases, the foam substrate unexpectedly separates from the groove.

Furthermore, the mount component is made in one piece which consists of a bottom panel for installing the foam substrate and two side walls for controlling foam development of the foam substrate. A large amount of resin material is required to produce such a mount component from synthetic resin materials, thus resulting in a higher cost.

OBJECT OF THE INVENTION

The purpose of this invention is, in light of the aforementioned conventional problems, to make the mount component smaller and to provide a mount construction for foam materials in hollow structures that easily, stably, and securely installs the support panels and the foam substrate to the mount component.

SUMMARY OF THE INVENTION

In order to achieve the aforementioned objective, the mount construction for a foam substrate inside a hollow structure or space of this invention comprises a mount construction that installs a foam substrate that insulates the hollow space, using foam development effected by external heating.

The mount construction features a flat panel-shaped foam substrate with a foam development-restrictive support panel (s) that is attached to at least one facing side(s) of the foam substrate. The mount component has extending mount pieces that anchor onto an inner wall of the hollow structure. A tack-together construction for the support panel(s) and foam substrate is used.

The support panel(s) are made of paper materials such as corrugated fiberboard and cardboard, etc.

In a first embodiment, the mount component includes a built-in locking clip that is insertable into a mounting hole drilled through an inner wall of the hollow structure to provide an elastic latch.

Other means for anchoring within the hollow space may be used herein.

The mount construction, preferably, includes a pair of support panels that sandwich two facing sides of the foam substrate and a tack-together construction of the support panels and the foam substrate. The foam substrate can be easily, stably, and securely installed, without separation, in a hollow space because the support panels and foam substrate are tacked together onto the mount pieces of the mount component.

After the mount component is anchored onto an inner wall surface of the hollow structure the foam substrate is foam-expanded into a foam substance by heating the hollow structure from the outside, resulting in insulation as well as vibration proofing and noise proofing of the hollow space inside the hollow structure.

Efficient insulation of the hollow space results through installation of the support panel(s) on at least one of two facing sides of the foam substrate, thereby restricting the foam material from foam-developing in the longitudinal direction of the hollow space, while aiding the foam development in the direction orthogonal to the longitudinal direction of the hollow space, as the foam substrate foam-expands.

For a more complete understanding of the present invention reference is made to the following detailed description and accompanying drawing. In the drawing, like reference characters refer to like parts throughout the several views in which:

BRIEF DESCRIPTION OF THE DRAWINGS

FIG. 2 is a longitudinal sectional view of a vehicle pillar with a foam substrate installed inside the hollow structure of the pillar;

FIG. 3 is a longitudinal sectional view of the pillar of FIG. 2 with the foam substrate expanded into a foam substance;

DESCRIPTION OF THE PREFERRED EMBODIMENT

Figure 1:
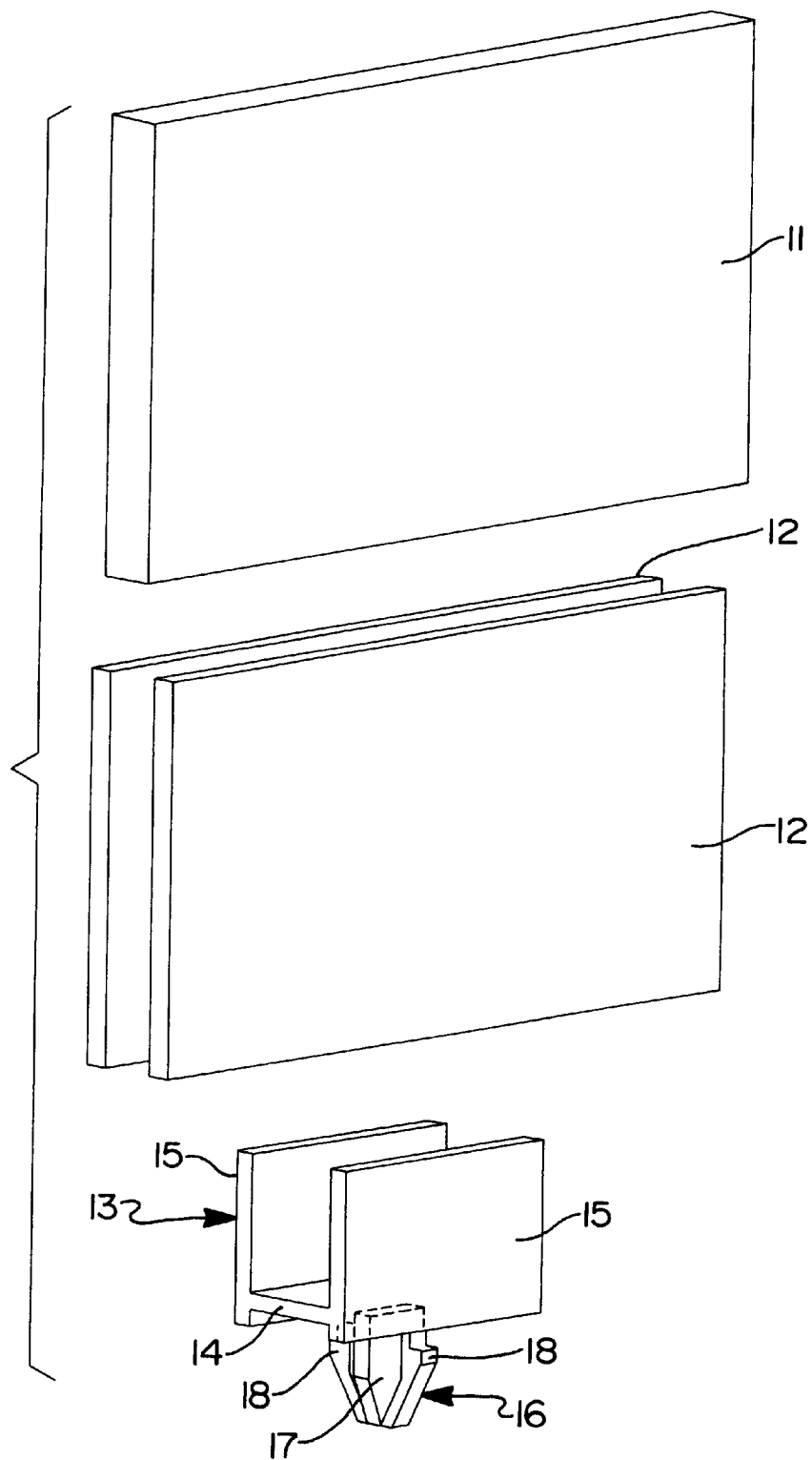
FIG. 1 is an exploded, perspective view showing the mount component, support panels, and the foam substrate of a first embodiment of this invention.

Referring first to FIGS. 1–6 there is shown, in a first embodiment hereof, a hollow, box-shaped, closed cross-section formed as a vehicle body pillar 1. The pillar 1 is a hollow structure. An inner panel 2 and an outer panel 4 are spot-welded together at flanges 3, 3' and 5, 5' provided on panels 2 and 4, respectively. The panels 2 and 4 cooperate to define the hollow structure having an interior hollow space 7. A non-circular mount hole 6, either as an ellipse, oval or rectangular shape, is drilled at a specified location in the inner panel 2, for inserting and latching a locking clip which will be described later.

Figure 6A:
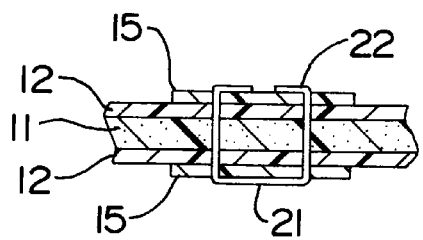
FIG. 6A is a cross-sectional view taken along line V1(A)—V1(A) of FIG. 4.

A foam substrate 11, which insulates the hollow space 7, in the pillar 1 is mounted to a mounting component 13. As shown in FIG. 6A, a pair of support panels 12, 12' support the two facing sides of the foam substrate.

The foam substrate 11 is made of synthetic resin material (s) mixed with a foaming agent, such as the blended foam material(s) disclosed in Patent Disclosure Bulletin Hei2-276836, the disclosure of which is hereby incorporated by reference. This foam expands at approximately 110° C.–190° C. (the heat at which a painted vehicle body is baked). The substrate 11 is formed with a rectangular flat panel shape and in a size that is appropriately smaller than the cross sectional configuration of the hollow space 7 in pillar 1.

As noted, a pair of support panels 12, 12' are attached to the two facing sides of the foam substrates 11 to sandwich the substrate 11. The foam substrate 11 is mounted on the mount component 13 together with the support panels 12, 12'.

The support panels 12, 12' are formed in a flat panel shape in almost the same size as the foam substrate 11 or in a somewhat smaller size. These support panels are made of paper materials such as corrugated fiberboard and cardboard or hardboard or synthetic resin panel, etc.

In FIGS. 1 and 2, there is shown the mount component 13. Preferably, the mount component 13 is injection-molded of synthetic resin in one piece comprising a base 14 having an upper and lower surface and which is the bottom panel and a pair of mount pieces 15, 15' which extend perpendicularly upward from the ends of the base 14. A locking clip 16, for insertion into the mount hole 6 in the inner panel 2 to provide an elastic latch, is provided on the lower surface of the base 14. The locking clip 16 includes a leg 17, which perpendicularly extends down from the lower surface of the base 14, and a pair of latching pieces 18 which extend(s) up from both sides of the tip of the leg 17, as shown. The latching pieces 18 are inserted in the mount hole 6 to provide the elastic latch.

The mount pieces 15, 15' of the mount component 13 are spaced apart at approximately the same dimension as the sum of the thickness of the pair of support panels 12, 12' and the foam substrate 11. The center of the lower part of the pair of support panels 12, 12' which are sandwiching the foam substrate 11 is fitted into the space between the mount pieces 15, 15', as shown.

In other words, in the first embodiment hereof and as shown in FIG. 6(A), first the lower part of the pair of support panels 12, 12' sandwiching the foam substrate 11 is fitted into the space between the mount pieces 15, 15' of the mount component 13. Then, at least one tack wire 21 is struck through the mount pieces 15, 15' and support panels 12, 12' and the foam substrate 11. The tips of the tack wires are folded back to form a tack 22, thereby tacking together the support panels 12, 12' and the foam substrate 11 onto the aforementioned mount pieces 15, 15'.

Figure 4:
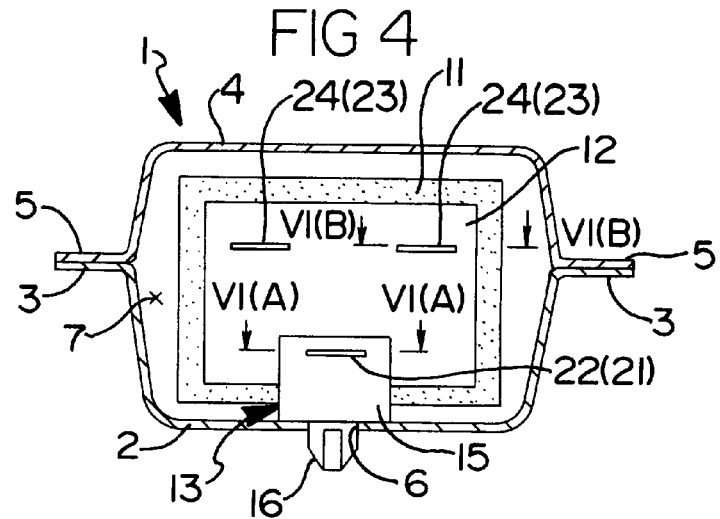
FIG. 4 is a cross-sectional view of a pillar when the foam substrate is installed inside.
Figure 6B:
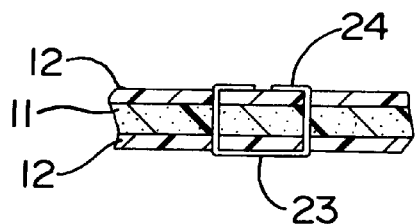
FIG. 6B is a cross-sectional view taken along line V1(B)—V1(B) of FIG. 4.

Furthermore, and as shown in FIGS. 4 and 6(B) at least one and, preferably, a plurality of tack wires 23, 23' are struck through approximately in the upper right and left edge of the pair of support panels 12, 12' and the foam substrate 11. The tips of the tack wires are folded back to form tacks 24, 24' thus, tacking together the pair of support panels 12, 12' and the upper right and left portions of the foam substrate 11.

Therefore, in this first embodiment the foam substrate 11 can be easily, stably, and securely installed even when the size of the mount pieces 15, 15' are reduced to the extent just enough for forming tacks 22, 24 through the pair of support panels 12, 12' and the foam substrate 11. This allows compacting the mount component 13.

Furthermore, when the support panels 12, 12' are formed of paper materials such as corrugated fiberboard and cardboard, tack-forming operations to form tacks 22, 24 becomes even easier. This greatly contributes to weight reduction and cost reduction.

As stated above, after the foam substrate 11 is installed between the mount pieces 15, 15' in the mount component 13 together with the support panels 12, 12', the locking clip 16 is inserted into the mount hole 6 in the inner panel 2. The latching pieces 18' of the locking clip 16 interlock with the mount hole 6, thereby effecting mounting of the mount component 13, through the locking clip 16 which is, thus, locked in the mount hole 6.

Thereafter, the inner panel 2 and outer panel 4 are spot-welded at the respective flanges 3, 3' and 5, 5' forming pillar 1 which has the hollow box-shaped cross section.

Figure 5:
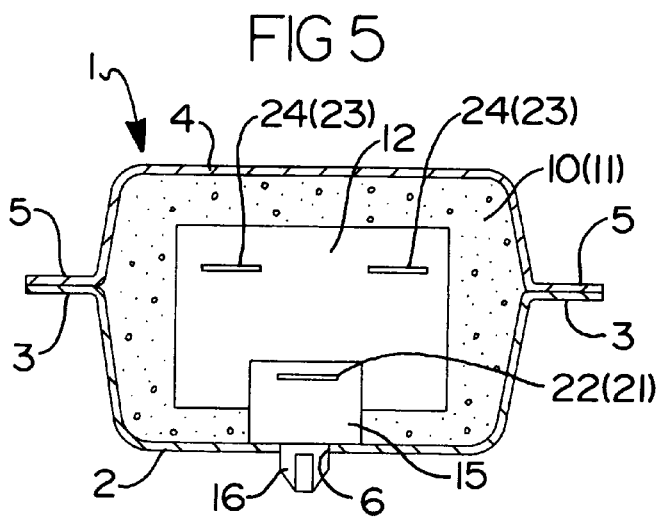
FIG. 5 is a cross-sectional view of the pillar of FIG. 4 when the foam substrate has expanded into foam substance.

At this point, the foam substrate is foam-expanded into foam substance 10, as shown in FIGS. 3 and 5, by external heat such as, for example, baking of the painted vehicle body which contains the pillar 1.

As the foam substrate 11 foam-expands, development of foam is controlled in the longitudinal direction of the hollow space 7 because the two facing sides of the foam substrate are sandwiched by the support panel 12, 12' while foam development in the direction orthogonal to the longitudinal direction of the hollow space 6 is effectively promoted. The circumference area of the foam substance 10, produced by form-expansion of the foam substrate 11, securely adheres to the surrounding inner wall surfaces of the hollow space 6 without creating voids.

As a result, the foam substrate 11 can be made of a small amount of foam material, and the hollow space 7 can be efficiently insulated.

Figure 7:
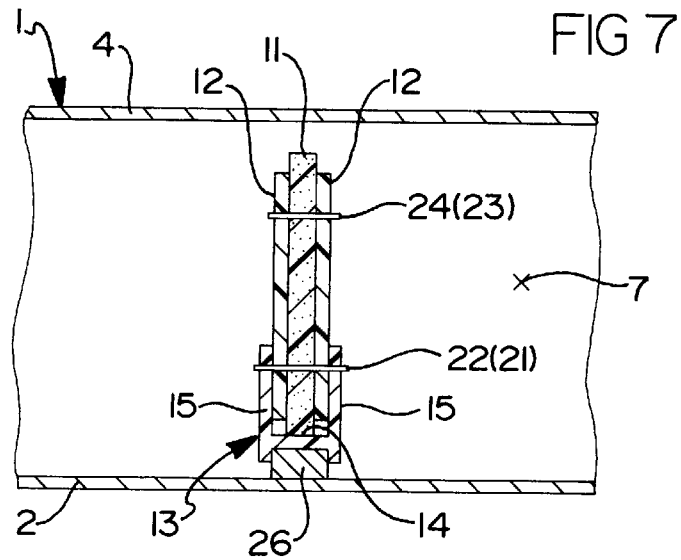
FIG. 7 is a broken, cross-sectional view of a second embodiment hereof.

In a second embodiment hereof and as shown in FIG. 7, a permanent magnet 26 is attached to the lower surface of the base 14 of the mount component 13, and the mount component 13 is mounted on the inner wall surface of the inner panel 2 through the magnetic force of the permanent magnet 26.

Other than this, the construction is identical to that of the first embodiment.

Figure 8:
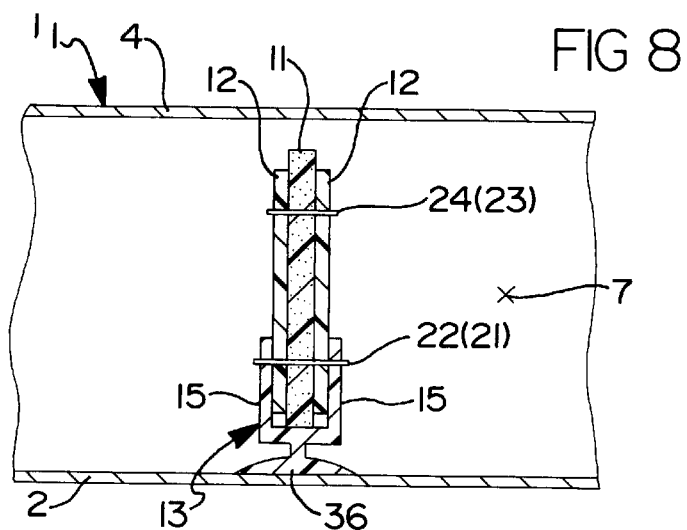
FIG. 8 is a broken, cross-sectional view of a third embodiment hereof.
Figure 9:
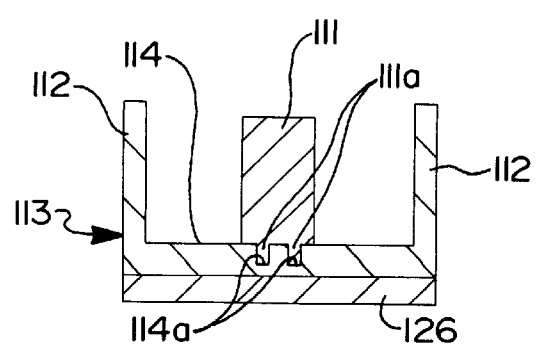
FIG. 9 is a cross-sectional view of a conventional mount construction as described hereinabove.

In a third embodiment hereof and as shown in FIG. 8, a suction disc 36 is built in the mount component 13 on the lower surface of the base 14. The mount component 13 is mounted to the inner wall surface of the inner panel 2 through a suction effect of the suction disc 36.

Other than this, the construction is identical to that of the first embodiment.

Although in the embodiments described herein a pair of support panels 12, 12' are attached to two facing sides of the foam substrate 11 and they are tacked together by tack 24 and, optionally tack 22 between a pair of mount pieces 15, 15' of the mount component 13, the present invention is not so-limited. A single support panel 12 and a single mount piece 15 may be used instead.

Likewise, the hollow structure may not be limited to a vehicle body pillar 1. It may be a rocker panel, roof side panel, as well as hollow structures other than vehicle bodies.

Having, thus, described the invention, what is claimed is:

1. A mount for installation to an interior wall of a hollow space of a hollow structure, comprising:
   (a) an expandable foam substrate, the substrate having opposed facing sides;
   (b) at least one support panel in abutment with one of the facing sides;
   (c) a tack attaching the substrate and the panel together to form an assembly;
   (d) means for anchoring the assembly to an interior wall of a hollow space of a hollow structure, and
   (e) a tack for attaching the assembly to the means for anchoring.

2. The mount of claim 1 which further comprises a second support panel, the second support panel being in abutment with an associated one of the facing sides of the foam substrate.

3. The mount of claim 2 wherein each support panel comprises a paper material support panel.

4. The mount of claim 2 wherein the support panels sandwich the foam therebetween and further wherein the tack attaches the substrate and the panels together.

5. The mount of claim 1 wherein the means for anchoring comprises a mount component, the mount component comprising:
   (a) a base;
   (b) a pair of upwardly projecting, spaced apart mount pieces projecting upwardly from the base, and
   (c) a locking clip downwardly extending from the base, the mounting clip including;
      (1) a leg which perpendicularly extends downwardly from the base, and
      (2) a pair of latching pieces which project laterally outwardly from the leg, the interior wall of the hollow structure having an opening formed therein through the which the locking pin projects.

6. The mount of claim 1 wherein the means for anchoring comprises:
   a magnetic mount, the mount comprising:
   (a) a base having an upper surface and a lower surface;
   (b) a pair of spaced apart mounting pieces projecting laterally upwardly from the upper surface of the base, the assembly being disposed between the mounting pieces and seating on the upper surface of the base, and
   (c) a magnet attached to the lower surface of the base.

7. The mount of claim 1 wherein the means for anchoring comprises:
   a mounting component including:
   (a) a base having an upper surface and a lower surface;
   (b) a pair of spaced apart mounting pieces which extend upwardly from the upper surface of the base, the assembly being disposed between the mounting pieces and seating on the upper surface of the base, and
   (d) a suction disc disposed on the lower surface of the base.

* * * * *